(12) United States Patent
Huang et al.

(10) Patent No.: US 8,786,776 B1
(45) Date of Patent: Jul. 22, 2014

(54) METHOD, APPARATUS AND SYSTEM FOR COMMUNICATING SIDEBAND DATA WITH NON-COMPRESSED VIDEO

(71) Applicant: Silicon Image, Inc., Sunnyvale, CA (US)

(72) Inventors: Jiong Huang, Sunnyvale, CA (US);
Jaeryon Lee, San Jose, CA (US);
Sergey Yarygin, San Jose, CA (US);
Gyudong Kim, San Jose, CA (US);
Chandlee Harrell, Los Altos, CA (US);
Payam Kermani, Cupertino, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 0 days.

(21) Appl. No.: 13/891,842

(22) Filed: May 10, 2013

(51) Int. Cl.
*H04N 7/00* (2011.01)

(52) U.S. Cl.
USPC ........................................................ 348/458

(58) Field of Classification Search
CPC .......... H04N 13/0059; H04N 13/0029; H04N 13/004; H04N 13/0051; H04N 19/00769
USPC .................... 348/461, 460, 467, 473, 474, 43
See application file for complete search history.

(56) References Cited

U.S. PATENT DOCUMENTS

| | | | | |
|---|---|---|---|---|
| 4,612,567 A * | 9/1986 | Pritchard | ................. | 348/451 |
| 4,641,186 A * | 2/1987 | Pritchard | ................. | 348/700 |
| 5,511,165 A * | 4/1996 | Brady et al. | ............. | 709/216 |
| 5,655,112 A * | 8/1997 | MacInnis | ................. | 345/501 |
| 7,782,934 B2 | 8/2010 | Choi | | |
| 8,090,030 B2 | 1/2012 | Kim et al. | | |
| 2011/0149032 A1* | 6/2011 | Choi et al. | ............. | 348/43 |
| 2012/0092450 A1 | 4/2012 | Choi et al. | | |

\* cited by examiner

*Primary Examiner* — Paulos M Natnael
(74) *Attorney, Agent, or Firm* — Fenwick & West LLP

(57) ABSTRACT

Techniques and mechanisms for communicating sideband information in a data frame including video data. In an embodiment, a data frame is exchanged between two device via a hardware interconnect which is compatible with physical layer requirements of an interface specification. The interface specification identifies a data frame format comprising a total of X consecutive horizontal lines of vertical blanking data and a total of Y consecutive horizontal lines of data including video data. In another embodiment, vertical blanking data of the data frame includes only (X−N) consecutive horizontal lines of data. Active data of the data frame includes N horizontal lines of data including sideband data, and Y additional horizontal lines of data including video data.

20 Claims, 10 Drawing Sheets

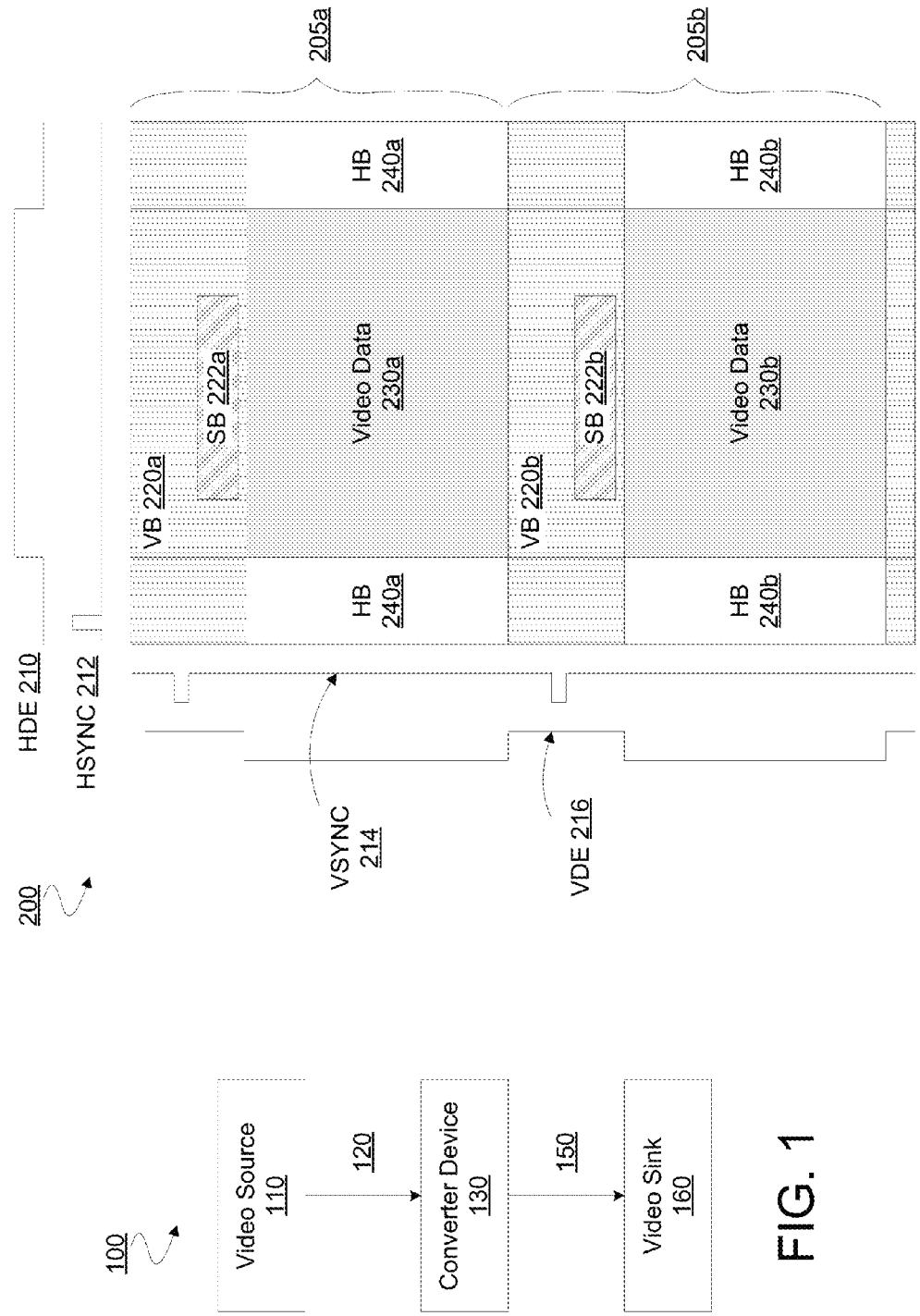

1100a

| Byte#\Bit# | 7 | 6 | 5 | 4 | 3 | 2 | 1 | 0 |
|---|---|---|---|---|---|---|---|---|
| HB0 | Packet Type = 0x81 | | | | | | | |
| HB1 | Version = 0x01 | | | | | | | |
| HB2 | 0 | 0 | 0 | Length = Nv | | | | |

| Byte#\Bit# | 7 | 6 | 5 | 4 | 3 | 2 | 1 | 0 |
|---|---|---|---|---|---|---|---|---|
| PB0 | Checksum | | | | | | | |
| PB1 | 24bit IEEE OUI | | | | | | | |
| PB2 | (least significant byte first) | | | | | | | |
| PB3 | | | | | | | | |
| PB4 | VSIF_Type (0x01) | | | | | | | |
| PB5 | Reserved (0) | | | SCM_Length (N) | | | | |
| PB6 | SCM_ID1 | | | | | | | |
| PB7 | B1 | Reserved (0) | | SCM_Length1 (N1) | | | | |
| PB8 | Data Byte 1 of SCM_ID1 | | | | | | | |
| ... | | | | | | | | |
| PB(7+N1) | Data Byte N1 of SCM_ID1 | | | | | | | |
| ... | | | | | | | | |
| PB(N1+...+N6+19) | SCM_ID7 | | | | | | | |
| PB(N1+...+N6+20) | B7 | Reserved (0) | | SCM_Length7 (N7) | | | | |
| PB(N1+...+N6+21) | Data Byte 1 of SCM_ID7 | | | | | | | |
| ... | | | | | | | | |
| PB(N1+...+N7+20) | Data Byte N7 of SCM_ID7 | | | | | | | |

VSIF_Type: [1 byte]
00: No valid type
01: SCM
02-FF: reserved
SCM_Length: [5 bits]
valid number of bytes for this payload
SCM_IDx: [1 byte]
the specific type of SCM to be identified. Only valid when VSIF Type is set as 1.
00: no valid SCM
01: VBI Raw Data
02-FF: reserved

FIG. 11B

1100c

| Byte#\Bit# | 7 | 6 | 5 | 4 | 3 | 2 | 1 | 0 |
|---|---|---|---|---|---|---|---|---|
| PB0 | Checksum ||||||||
| PB1 | 24bit IEEE OUI ||||||||
| PB2 | (least significant byte first) ||||||||
| PB3 | ||||||||
| PB4 | VSIF_Type (0x01) ||||||||
| PB5 | Reserved (0) |||| SCM_Length (4) ||||
| PB6 | SCM_ID(0x01) ||||||||
| PB7 | B1(1) | Reserved (0) || SCM_Length1 (2) |||||
| PB8 | Rsvd(0) | VIC6 | VIC5 | VIC4 | VIC3 | VIC2 | VIC1 | VIC0 |
| PB9 | Last Line Number with Active VBI ||||||||
| PB10-PB27 | Reserved(0) ||||||||

FIG. 11C

1100d

| Byte# | 7 | 6 | 5 | 4 | 3 | 2 | 1 | 0 |
|---|---|---|---|---|---|---|---|---|
| 0 | Vendor-specific tag code (=3) ||| Length (=N) |||||
| 1 | 24bit IEEE OUI ||||||||
| 2 | (least significant byte first) ||||||||
| 3 | ||||||||
| 4 | Rsvd(0) ||||||| Supports_RawVBI |
| 5 | First Line Number with Active VBI ||||||||
| ... | Reserved (0) ||||||||

FIG. 11D

METHOD, APPARATUS AND SYSTEM FOR COMMUNICATING SIDEBAND DATA WITH NON-COMPRESSED VIDEO

BACKGROUND

1. Technical Field

Embodiments of the invention generally relate to the field of data communications and, more particularly, but not exclusively, to formatting data for a data stream.

2. Background Art

In certain systems, data may be transmitted over a data link between audio/video (AV) devices. For example, a stream of AV data may be sent from a first device to second device, where the second device may either utilize the content data or re-transmit such data to another device.

In the data transfer operation, the data stream that is being transmitted may be changed from a first format to a second format, where the receiving device is required to interpret and handle the data in the second format in a manner that is different than handling data in the first format.

Certain types of information embedded in a data stream— referred to generally herein as sideband information—are not currently supported in the converting of such a data stream to various high-definition ("HD") digital AV formats. When a Vertical Blanking Interval (VBI) of a data stream includes closed captioning information, teletext information, or other such sideband information, conversion of the data stream to a format compatible with a High-Definition Multimedia Interface (HDMI) specification or a Mobile High-definition Link (MHL) specification results in the sideband information simply being stripped out. Otherwise, such sideband information has to be processed in advance by an AV source device which decodes and then blends the sideband information with corresponding video data, where a resulting data stream including the blended video data is then sent in a HD format to a digital AV sink device. Consequently, digital-only televisions don't receive sideband information in a vertical blanking period of a HD data stream. However, the decoding and blending of sideband information requires additional complexity and resource load for AV source devices.

BRIEF DESCRIPTION OF THE DRAWINGS

The various embodiments of the present invention are illustrated by way of example, and not by way of limitation, in the figures of the accompanying drawings and in which:

FIG. 1 is a block diagram illustrating elements of a system for exchanging AV communications according to an embodiment.

FIG. 2 is a hybrid block-timing diagram illustrating elements of a data frame to be converted according to an embodiment.

FIGS. 11A-11D are tables each illustrating elements of respective packets of data for communicating sideband information according to various embodiments.

DETAILED DESCRIPTION

Figure 3:
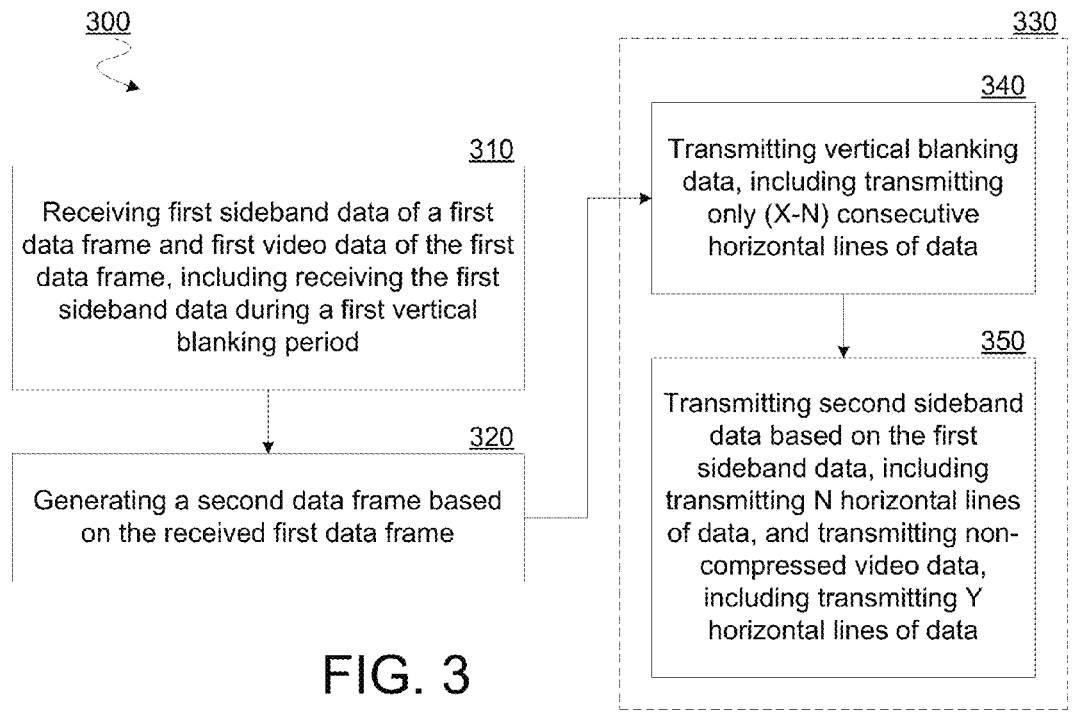
FIG. 3 is a flow diagram illustrating elements of a method for converting a data frame according to an embodiment.

Embodiments discussed herein variously make, use or otherwise provide logic to communicate sideband information in a non-compressed digital AV context. For example, certain embodiments provide for a second data frame including second video data to be generated based on a first data frame which includes first video data and first sideband data. The first sideband data may be received in a blanking interval of the first data frame. In an embodiment, the second data frame includes second sideband data based on the first sideband data—e.g. where the second sideband data is in an active frame portion of the second data frame. Generation of the second sideband data based on the first sideband data may include double sampling some or all values of the first sideband data.

As used herein, the term "AV sink"—or simply "sink"— refers to the characteristic of a device receiving AV information from some other device. Correspondingly, the term "AV source"—or simply "source"—refers to the characteristic of a device providing AV information to some other (sink) device.

As used herein, "audio/video" or "AV" refers to the characteristic of relating to either audio content or video content, or relating to both audio content and video content. For example, AV information may include some or all of audio data and/or control information and video data and/or control information. In an embodiment, an AV device may, in addition to exchanging AV information with another device, be operable to render audio content and/or video content for a user. Various embodiments are discussed herein with respect to video data of data frames. Such data frames may also include audio data, for example, although certain embodiments are not limited in this regard.

An AV device according to an embodiment includes communication logic to exchange AV data which in one or more respects is according to some interface standard. By way of illustration and not limitation, such communication logic may exchange AV data via a connector and/or interconnect which is compatible with one or more of an HDMI standard such as the HDMI 1.4b standard released October, 2011 by HDMI Licensing, LLC of Sunnyvale, Calif., a Mobile High-Definition Link (MHL) standard such as the MHL 2.1 specification released March, 2013 by the MHL Consortium of Sunnyvale, Calif., a Digital Visual Interface (DVI) standard such as the DVI 1.0 standard released Apr. 2, 1999 by the Digital Display Working Group of Vancouver, Wash., a DisplayPort standard such as the DisplayPort 1.2a standard released May, 2012 by the Video Electronics Standards Association of Newark, Calif. and/or the like. Certain embodiments are not limited to processing communications which are exchanged according to a non-compressed video interface specification which currently exists. For example, such embodiments may be variously applied to communications which are exchanged according to other non-compressed video interface specifications which, for example, are to include data frame formats having characteristics such as those discussed herein.

In an embodiment, such communication logic may implement communications which, at different times, are compatible with different interface standards, where all such communications are via the same connector. For example, communication logic may include first logic to detect the presence of, and communicate with, a HDMI device and second logic to detect the presence of, and communicate with, a MHL device, where the respective detection and communication functionalities of the first logic and second logic do not conflict with or otherwise impede the other. Such communication logic may, for example, be referred to as "MHL-ready HDMI," "HDMI/MHL" and/or the like. Features of various embodiments are discussed herein in the context of exchanging AV information according to an HDMI interface standard. However, such discussion may be extended to apply to any of a variety of additional or alternative interface standards for exchanging AV data, according to different embodiments.

As used herein, the term "data frame" refers to a logical grouping of data—e.g. where a beginning and an end of the data frame are each indicated by, or otherwise associated with, a respective control signal, a time interval and/or the like. In an embodiment, a data frame includes video data and both of packetized data (or "data islands") and non-packetized control data to variously facilitate processing of such audio/video data. For example, a data frame may include what is referred to herein as "blanking data" which is communicated during a blanking interval (or "blanking period") of the data frame—e.g. a horizontal blanking interval or a vertical blanking interval. The data frame may further include what is referred to herein as "active data" which is distinguished from blanking data. The term "active frame" is used herein to refer to all active data of a data frame, and the term "video frame" is used herein to refer to all video data of a data frame. The term "line" refers to logic grouping of data included in a data frame—e.g. where one or more control signals distinguish one set of data as belonging to a first line and another set of data as belonging to a second line. With reference to lines of data, the terms "horizontal" and "vertical" are used according to conventional use to distinguish different types of logical grouping of data in a data frame.

FIG. 1 illustrates elements of a system 100 for exchanging AV information according to an embodiment. System 100 may include a video source 110, a video sink 160 and a converter device 130 comprising logic—e.g. any of a variety of combinations of hardware, firmware and/or executing software—to variously facilitate AV communications between video source 110 and video sink 160. In an embodiment, video source 110 and converter device 130 are respective components of a single larger device (not shown) of system 100. One embodiment may be implemented entirely by converter device 130, for example. Another embodiment may be implemented entirely by a single device of which video source 110 and converter device 130 are each a component. Still another embodiment may be implemented by system 100 as a whole. Any of a variety of other embodiments may be alternatively implemented according to techniques discussed herein.

In an embodiment, video source 110 includes functionality of one or more conventional AV source devices. By way of illustration and not limitation, video source 110 may include functionality including, but not limited to, that of a personal computer (e.g. tablet, notebook, laptop, desktop and/or the like), camcorder, smart phone, video game console, television, monitor, display, set-top box, home theater receiver and/or the like. In an embodiment, video source 110 is a component—e.g. a hard disk drive, a solid state drive, a bus, an input port, etc.—of such an AV source device. Alternatively or in addition, video sink 160 may include functionality of one or more conventional sink devices including, but not limited to, a television, monitor, display and/or the like. In an embodiment, video source 110 is further capable of variously providing functionality of one or more conventional AV sink devices and/or video sink 160 is further capable of variously providing functionality of one or more conventional AV source devices.

Video source 110 may send to converter device 130 a communication 120 including a first data frame. In an embodiment, communication 120 is according to a format which supports one or more types of sideband data—e.g. where blanking data of the first frame includes such sideband data. By way of illustration and not limitation, the first data frame of communication 120 may be according to a standard-definition AV format such as 480i, 576i, an analog television format, or even a high definition format which supports sideband communication in a blanking period.

In an embodiment, a blanking period of the first data frame includes sideband data and an active frame of the first data frame includes video data. Control data of communication 120 may distinguish a blanking period of the first data frame from one or more periods for communicating the active data. By way of illustration and not limitation, a blanking period and an active data period may be distinguished from one another by a vertical synchronization (VSync) control signal, a horizontal synchronization (HSync) control signal, and/or one or more data enable (DE) signals—e.g. including a horizontal DE signal, a vertical DE signal and/or a logical combination thereof.

Converter device 130 may generate a second communication 150 which includes a second frame based at least in part on the first frame of communication 120. In an embodiment, converter device 130 is a hardware interconnect device directly coupled to one or both of video source 110 and video sink 160—e.g. where converter device 130 includes a cable and a connector housing (not shown) at one end of such cable, the connector housing including logic to provide data frame conversion functionality discussed herein.

In an embodiment, at least part of communication 150 is via a hardware interconnect which is compatible with the physical layer requirements of an interface specification for communicating non-compressed video data (for brevity, simply referred to herein as a "non-compressed video interface specification"). By way of illustration and not limitation, the hardware interconnect may be compatible with connector, cable and/or other hardware requirements identified in one or more of HDMI, MHL or other such specifications.

The non-compressed video interface specification may identify—e.g. specify or reference—a data frame format which, for example, requires a respective number of bits-per-pixel, pixels-per-line, lines-per-frame, a respective number of periods of time for a horizontal blanking interval, a vertical blanking interval, an active data frame, a video data frame and/or the like.

In an embodiment, the data frame format identified in the non-compressed video interface specification includes a total of X consecutive horizontal lines of data in a vertical blanking interval (VBI), where X is an integer. Alternatively or in addition, such a data frame format may include an active frame which comprises a total of Y horizontal lines of a video data, where Y is another integer. Audio data, if present, may be distributed across X lines of VBI and horizontal blanking periods of Y lines of active data. The data frame format may not distinguish an active frame from a video frame—e.g. where all data in an active frame is video data, according to the data frame format.

The second frame of communication 150 may include a format which is a modified version of the data frame format identified in the non-compressed video interface specification. By way of illustration and not limitation, the second data frame may include an active frame comprising data—e.g. including the second sideband data—in addition to video data. For example, the active frame of the second data frame may include video data comprising a total of Y horizontal lines of data, and further include N horizontal lines of the second sideband data, where N is an integer. The video data of the second data frame may include what is referred to herein as "raw" video data—i.e. a sequence of non-compressed pixel color values each for a respective one of multiple pixels. By contrast, sideband data of an active frame may include values other than pixel color values—e.g. including teletext information, closed caption information, Macrovision information and/or the like. Sideband raw data may be communicated via a Luma channel of video, although certain embodiments are not limited in this regard.

Raw video data of the second data frame may be transmitted in communication 150 in non-packetized format, for example. In an embodiment, a vertical blanking period of the second data frame may include a total of (X−N) horizontal lines of data. Generating of the second sideband data may include performing a double sampling of some or all values of the first sideband data, although certain embodiments are not limited in this regard.

FIG. 2 illustrates elements of data frames 200, one or more of which are to be variously processed by a converter device according to an embodiment. One or more of data frames 200 may be processed by a device having some or all of the features of converter device 130. Data frames 200 may be sent in communication 120, for example. In an embodiment, processing one of data frames 200 is to generate a second data frame (not shown), where an active frame of the second data frame includes video data and sideband data in addition to such video data.

Data frames 200 may be formatted according to an AV specification which supports communication of sideband data in a blanking period of a data frame. For example, data frames 200 may be arranged according to a format compatible with 576i, 480i or the like. In an embodiment, transmission of a data frame according to such an AV specification includes sequentially sending horizontal lines of data—e.g. where types of data of the horizontal lines (and/or of portions of such lines) are variously indicated by one or more control signals transmitted in or with the data frame. For example, a timing of such control signals may distinguish various blanking interval data and active data from one another. Such an AV specification may support the providing of sideband data in a blanking interval and video data in an active frame which is distinct from that vertical blanking period.

In the example represented by data frames 200, data frame 205a includes vertical blanking interval VB 220a, horizontal blanking intervals HB 240a and an active frame comprising video data 230a. Similarly, data frame 205b may include vertical blanking interval VB 220b, horizontal blanking intervals HB 240b and an active frame comprising video data 230b. In the case of 576i, for example, video data 230a may span 288 horizontal lines of data (e.g. where portions of such 288 horizontal lines include horizontal blanking data outside of video data 230a) and VB 220a may include 24 or 25 horizontal lines of data. However, additional or fewer horizontal lines may be used for variously communicating either or each of video data 230a and VB 220a, according to different embodiments.

Video data of data frame 205a may be indicated when both a horizontal data enable control signal HDE 210 and a vertical data enable control signal VDE 216 are asserted. Additionally or alternatively, a vertical blanking interval such as VB 220a may be indicated when VDE 216 is not asserted. Additionally or alternatively, a horizontal blanking period—e.g. one of horizontal blanking intervals HB 240a—may be indicated when HDE 210 is not asserted, but VDE 216 is asserted. A horizontal blanking interval may span a pulse of a horizontal synchronization control signal HSYNC 212, a pre-determined front porch period before such pulse and a pre-determined back porch period after such pulse. Additionally or alternatively, a vertical blanking interval may span a pulse of a vertical synchronization control signal VSYNC 214, a pre-determined front porch period before such a pulse and a pre-determined back porch period after such a pulse. Hsync may be asserted periodically during vertical blanking period.

In an embodiment, vertical blanking intervals VB 220a, VB 220b include respective sideband data SB 222a, SB 222b. For example, either or each of SB 222a, SB 222b may include respective sideband (e.g. closed caption) data. Typically, such sideband data, if available, is included in horizontal lines of a vertical blanking period which are during a back porch period after a VSYNC 214 pulse.

FIG. 3 illustrates elements of a method 300 for processing a data frame according to an embodiment. Method 300 may be performed by a device which provides functionality of converter device 300, for example. In an embodiment, method 300 operates on a data frame having some or all of the features of data frame 205a (and/or of data frame 205b).

Method 300 may include, at 310, receiving first sideband data of a first data frame and first video data of the first data frame. The first sideband data may be received during a first vertical blanking period—e.g. where some or all of the first video data is received during one or more active data periods which are each distinct from the first vertical blanking period. By way of illustration and not limitation, the first vertical blanking period, first sideband data and first video data may be VB 220a, SB 222a and video data 230a, respectively In an embodiment, method 300 includes, at 320, generating a second data frame based on the received first data frame. Generating the second data frame 320 may include, or otherwise be based on, a double sampling of the received first sideband data. Such double sampling may include generating, for a given value of the received first sideband data, two signals each to provide a different respective representation of that given value.

Method 300 may further include operations, at 330, which transmit the second data frame via a hardware interconnect compatible with physical layer requirements of an non-compressed video interface specification. For example, generating the second data frame at 320 may include converting one or more portions of the first data frame—e.g. including converting the first video data—to be compatible in at least certain respects with various characteristics of a frame format described in the non-compressed video interface specification. The non-compressed video interface specification may be a HDMI specification or a MHL specification, although certain embodiments are not limited in this regard. In an embodiment, the data frame format described in the non-compressed video interface specification comprises a total of X consecutive horizontal lines of vertical blanking data and a total of Y other consecutive horizontal lines of data including video data, where X is a first integer and Y is a second integer.

In an embodiment, operations 330 include, at 340, transmitting vertical blanking data during a data disable period, including transmitting only (X−N) consecutive horizontal lines of data, where N is a third integer. For example, the data disable period may be a vertical blanking period, where a total number of the horizontal lines transmitted in the vertical blanking period is equal to (X−N). The data disable period may be defined by or otherwise indicated by a value of a data enable signal such as VDE 216. The data enable signal may distinguish a vertical blanking period of the second data frame from another period—referred to herein as a data enable period—for transmitting other horizontal lines of the second data frame which include video data.

Operations 330 may further include, at 350, transmitting which take place during a data enable period. The data enable period may be distinguished from the data disable period of operation 340—e.g. by a transition of a data enable signal such as VDE 216. For example, the data enable period may be a period for transmitting second sideband data based on the first sideband data, including transmitting N horizontal lines of data. The transmitting at 350 may further include transmitting horizontal lines of the second data frame which include video data. The transmitting at 350 may include transmitting non-compressed video data, including transmitting Y horizontal lines of data.

Figure 4:
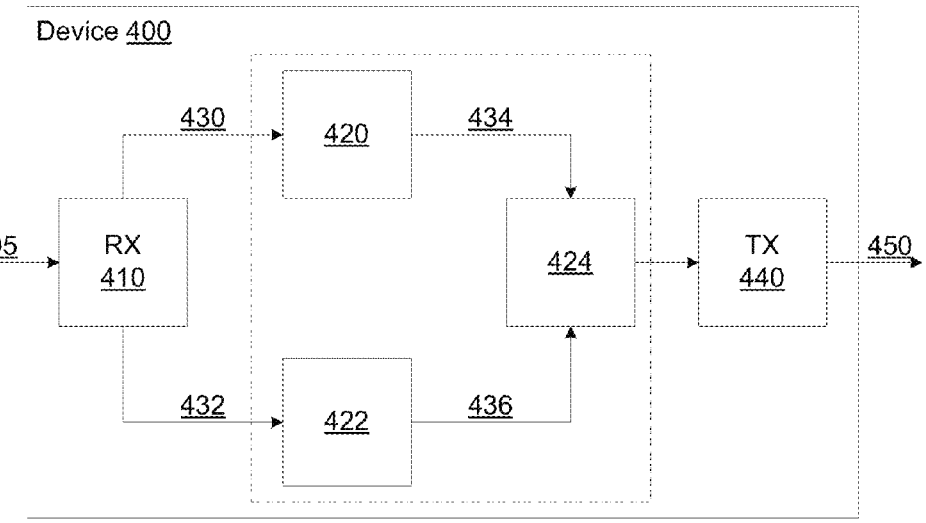
FIG. 4 is a block diagram illustrating elements of a device for converting a data frame according to an embodiment.

FIG. 4 illustrates elements of a device 400 according to an embodiment for processing a data frame including sideband data. Device 400 may include some or all of the features of converter device 130, for example. In an embodiment, device 400 is to process a data frame by performing some or all of the operations of method 300.

Device 400 may include receiver circuitry RX 410 to receive an input 405 which includes one or more features of communication 120. For example, input 405 may include a data frame comprising a data disable period—e.g. a vertical blanking interval—which includes closed captioning data or other sideband data. The data frame may further include an active data frame comprising video data. RX 410 may include logic to identify one or more portions of input 405 as being sideband data. For example, where sideband data of input 405 is packetized, logic of RX 410 may detect for a header (or other information) of a packet which is indicative of a sideband data type. Alternatively or in addition, RX 410 may identify that a format of the data frame includes a particular time interval dedicated to the communication of sideband data. RX 410 may identify sideband data of the received data frame based on such a time interval.

In an embodiment RX 410 provides to process circuitry 420 of device 400 first sideband data 430 which is based on the sideband data of the received data frame. By way of illustration and not limitation, RX 410 may perform demultiplexing to separate sideband data for direction to process circuitry 420. In an embodiment, RX 410 double samples received sideband data to generate first sideband data 430. Alternatively, such double sampling may be performed by process circuitry 420 after receiving first sideband data 430. RX 410 may further provide first frame data 432 to process circuitry 422 of device 400, where first frame data 432 includes, or is otherwise based on, video data of the data frame received input 405. For example, first frame data 432 may include some or all of video data, control data and packetized data other than data represented in first sideband data 430. Where first frame data 432 includes such sideband data, process logic 422 may mask out such data to accommodate later data frame processing by device 400.

In an embodiment, process circuitry 420 performs one or more operations to generate second sideband data 434 based on first sideband data 430. By way of illustration and not limitation, process circuitry 420 may perform operations for variously allocating sideband data values each to a respective channel of a hardware connector (not shown) of device 400 for transmitting an output 450. For example, process circuitry 420 may directly or indirectly allocate different samples of the same sideband value each to a different respective hardware channel. Generation of second sideband data 434 may further include process circuitry 420 performing any of a variety of additional operations—e.g. for translating, buffering, ordering, synchronizing, conditioning and/or otherwise processing values of first sideband data 430—to provide for inclusion of second sideband data 434 into an active frame of a data frame for output 450.

In an embodiment, process circuitry 422 performs one or more operations to generate second frame data 436 based on first frame data 432. By way of illustration and not limitation, process circuitry 422 may perform operations for variously convert, synchronize, order, condition or otherwise generate video data having one or more characteristics of a data frame format according to a non-compressed video interface specification. Generation of second frame data 436 may include one or more operations according to conventional techniques for converting video data and/or control data into a format compatible with an HD AV standard. Such techniques are beyond the scope of this disclosure, and are not limiting on certain embodiments.

Second frame data 436 and second sideband data 434 may be provided to process circuitry 424 of device 400—e.g. where process circuitry 424 is to generate a second frame which includes an active frame comprising both non-compressed video data and sideband data. In an embodiment, process circuitry 424 performs one or more multiplexing operations to variously interleave portions of second sideband data 434 with portions of second frame data 436. Process circuitry 424 may provide resulting signals to a transmitter TX 440 of device 400, where TX 440 transmits an output 450 including the resulting data frame. In an embodiment, transmission of the data frame in output 450 is according to the transmitting of operations 330.

Figure 5A:
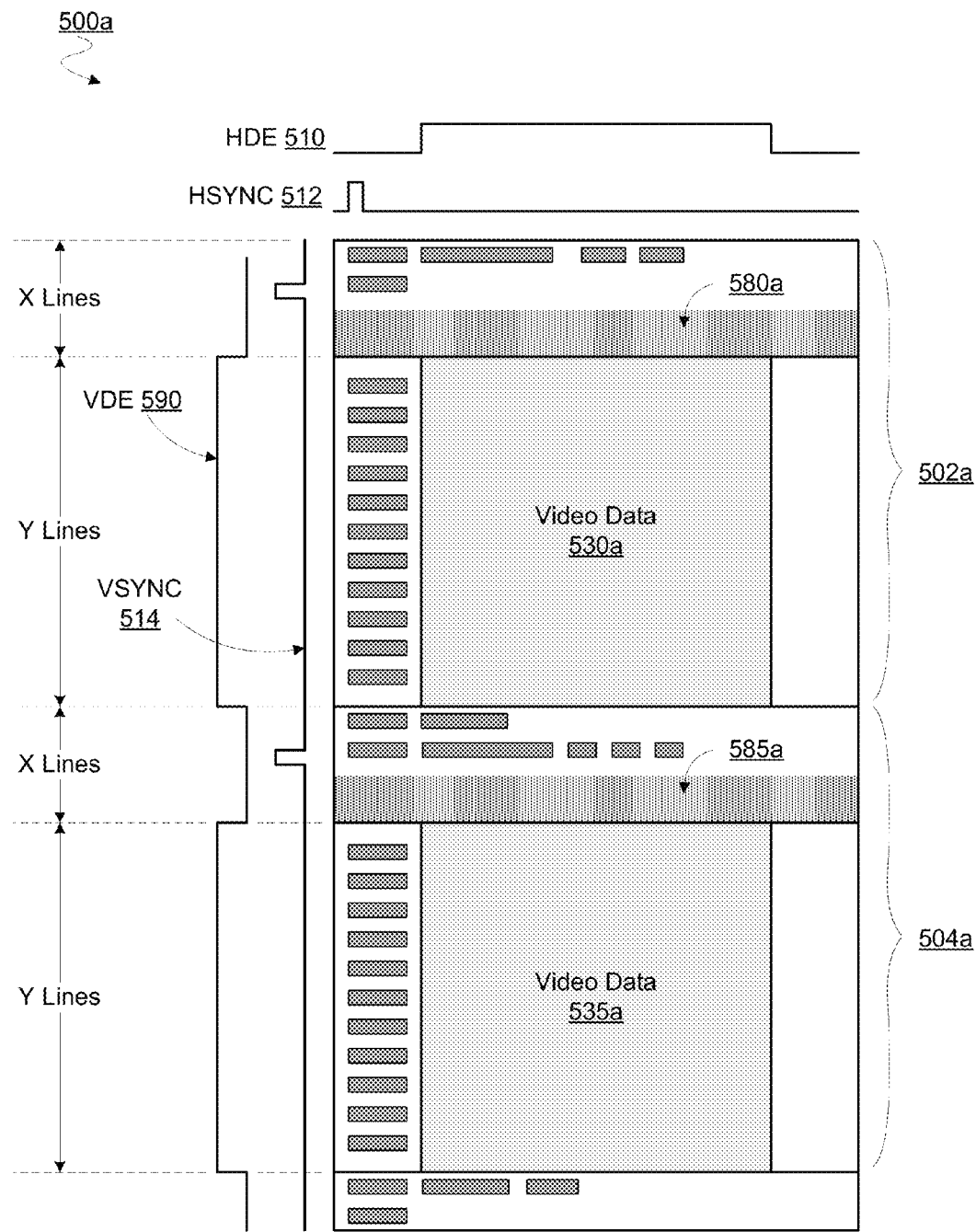
FIG. 5A is a hybrid block-timing diagram illustrating elements of a data frame to be processed according to an embodiment.

FIG. 5A illustrates elements of data frames 500a, one or more of which are at least partially processed by a converter device according to an embodiment. One or more of data frames 500a may be generated and further processed by a device having some or all of the features of converter device 400, for example. In an embodiment, one or more of data frames 500a are included in second frame data 436.

Data frames 500a may include partially processed data frames 502a, 504a arranged for variously conforming in one or more respects with a data frame format identified in a non-compressed video interface specification. For example, data frame 502a may include video data 530a to be included in an active frame of a final resulting data frame. Horizontal lines of video data 530a may be arranged to support a timing, according to the specified data frame format, specific to communication of horizontal lines of video data. Data frame 504a may include similarly arranged video data 535a.

Additionally or alternatively, the partially processed data frame 502a may include blanking data to be variously included in horizontal blanking intervals of the final resulting data frame. In an embodiment, such blanking data may be arranged for inclusion in horizontal blanking intervals which, according to the specified data frame format, each span a respective pulse of a horizontal synchronization control signal HSYNC 512 (which distinguishes horizontal lines of data), a pre-determined front porch period before such pulse and a pre-determined back porch period after such pulse. Data frame 504a may include similarly arranged horizontal blanking data.

Additionally or alternatively, the partially processed data frame 502a may include other blanking data to be included in a vertical blanking interval of the final resulting data frame. Such other blanking data may be of a type which is supported by a vertical blanking interval according to the specified data frame format.

In an embodiment, the data frame format described in the non-compressed video interface specification may identify that a vertical blanking interval of a data frame is to include a total of X consecutive horizontal lines of data and, in addition, that the data frame is to further include a total of Y other consecutive horizontal lines of data including video data. According to the specified data frame format, the vertical blanking interval is indicated when a vertical data enable control signal—represented by VDE 590—is de-asserted. Each of the Y consecutive horizontal lines of data may include a respective horizontal blanking period and a respective active data period—e.g. where a horizontal blanking period is indicated when a horizontal data enable control signal HDE 510 is not asserted, but VDE 590 is asserted. VDE 590 is shown in FIG. 5A merely to illustrate how, in certain embodiments, certain features of a final resulting data frame based on data frame 502a will deviate from the specified data frame format.

In FIG. 5A, data frame 502a is shown as including horizontal lines 580a which, according to the specified data frame format, are to include vertical blanking data. Data frame 504a is shown as including similar horizontal lines 585a. In an embodiment, horizontal lines 580a (or horizontal lines 585a) include placeholder data which, for example, is to be variously replaced, in subsequent processing, with sideband data such as second sideband data 434. In an alternate embodiment, data frame 502a may not include any such horizontal lines 580a—e.g. where later processing is to add sideband data such as second sideband data 434 to data frame 502a in the illustrated location of horizontal lines 580a. A final resulting data frame based on data frame 502a may include, or be communicated with, a vertical data enable control signal—e.g. other than VDE 590—which designates such added sideband data as being active data residing in an active frame of the final resulting data frame.

Figure 5B:
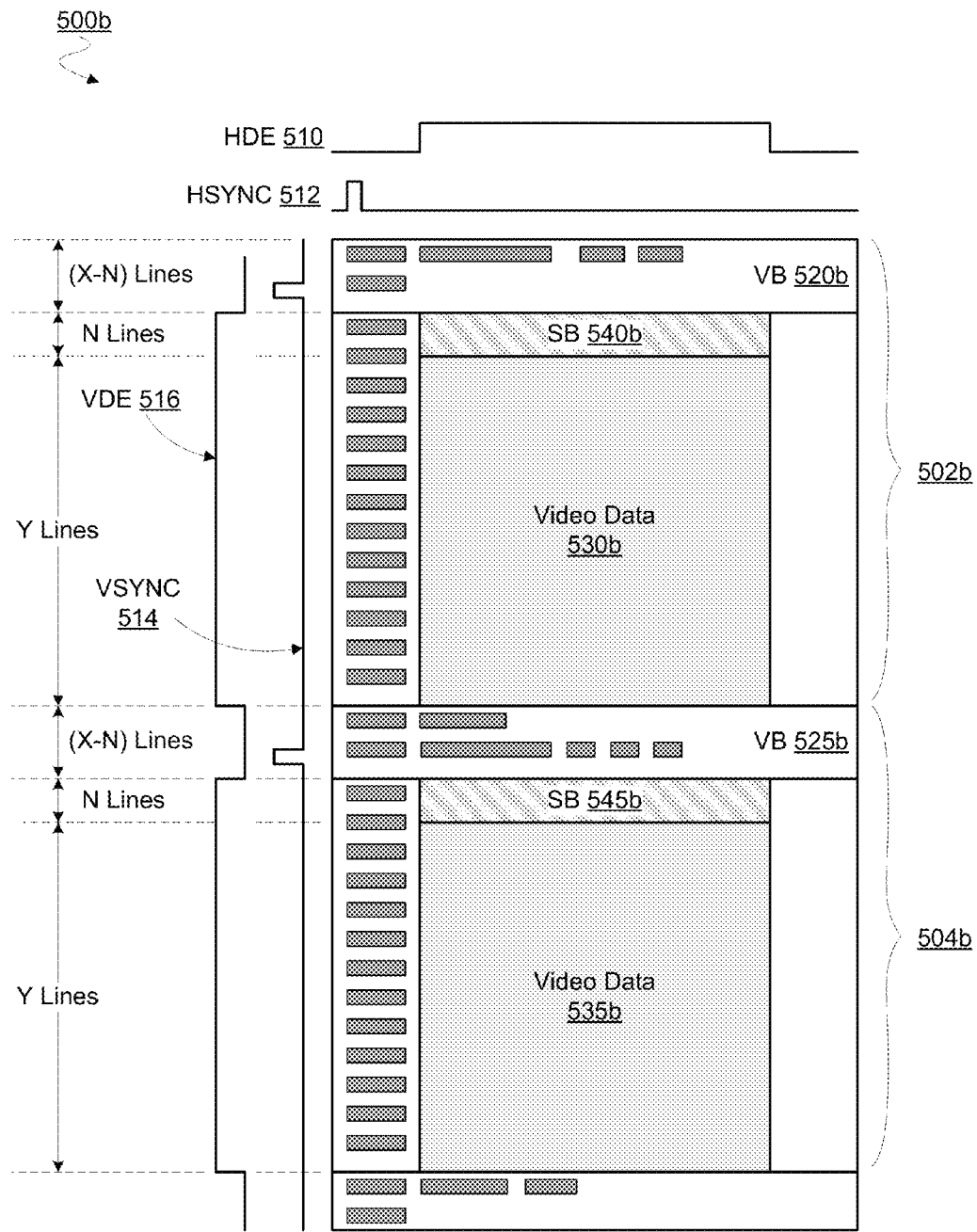
FIG. 5B is a hybrid block-timing diagram illustrating elements of a data frame to be exchanged according to an embodiment.

FIG. 5B illustrates elements of data frames 500b processed by a converter device according to an embodiment. One or more of data frames 500b may be generated and further processed by a device having some or all of the features of converter device 400, for example. In an embodiment, data frames 500b include data frames 502b, 504b generated based on partially processed data frames 502a, 504a, respectively.

Data frame 502b includes a vertical blanking interval VB 520b comprising a total of only (X−N) consecutive horizontal lines of data. Data frame 502b may further include another (Y+N) consecutive lines of horizontal data which each include respective horizontal blanking data and respective active data. By way of illustration and not limitation, the (Y+N) consecutive horizontal lines may include N horizontal lines which each include a respective horizontal blanking data and a respective portion of sideband data SB 540b. The (Y+N) consecutive horizontal lines may further include Y horizontal lines which each include a respective horizontal blanking data and a respective portion of video data 530b. In an alternate embodiment, the N horizontal lines for communicating SB 540b and the Y horizontal lines for communicating video data 530b may be transmitted in a different order, interleaved with one another, and/or the like.

In an embodiment, a vertical data enable control signal VDE 516 indicates a data enable period which is used to identify both SB 540b and video data 530b as being active data of data frame 502b. Each of the respective polarities—e.g. active low or active high—of HDE 510, VDE 516, HSYNC 512 and VSYNC 514 is merely illustrative, and may not be limiting on certain embodiments. VDE 516 results in VB 520b and VB 525b each having a respective span which deviates from the data frame format discussed herein with reference to FIG. 5A. Control signals HDE 510, HSYNC 512 and VSYNC 514 may otherwise support communication of data frames 502b, 504b according to the data frame format.

Figure 6:
FIG. 6 is a timing diagram illustrating elements of an exchange of a data frame according to an embodiment.

FIG. 6 shows a timing diagram 600 illustrating elements of an exchange of a data frame. Timing diagram 600 includes HSYNC 620 and VSYNC 630 which functionally correspond, respectively, to HSYNC 512 and VSYNC 514. Timing diagram 600 further includes a data enable state DE 610 which corresponds logically to a result of a Boolean AND operation on a vertical data enable control signal such as VDE 516 and a horizontal data enable control signal such as HDE 510. The various signal polarities shown in timing diagram 600 are merely illustrative and may not all match the corresponding polarities of a data frame format identified in the non-compressed video interface specification. Such signal polarities are not limiting on certain embodiments.

Timing diagram 600 shows elements of an exchange of an illustrative 312 horizontal line Field 1 of a data frame which, for example, includes some or all of the features of data frame 502b. Timing diagram 600 represents a timing which is a modified version of that for a data frame format described in a specification—in this example, digital 576i—for communicating non-compressed digital video. For example, the highlight area of timing diagram 600 includes 17 horizontal lines of data when DE 610 is active, where the 17 horizontal lines are for the communication of sideband (SB) data. But for such modified timing, DE 610 might, according to the specified data frame format, remain deasserted during these 17 lines, indicating a longer vertical blanking period which, nevertheless, is unable to support the communication of closed caption data (or certain other types of sideband data).

FIG. 6 also shows a timing diagram 605 illustrating additional elements of the data frame exchange represented in timing diagram 600. Timing diagram 605 includes DE 640, HSYNC 650, VSYNC 650 which functionally correspond, respectively, to DE 610, HSYNC 620, VSYNC 630. In an embodiment, DE 610, HSYNC 620, VSYNC 630 are indicated by control signaling specific to one field of the data frame, and DE 640, HSYNC 650, VSYNC 660 are indicated by control signaling specific to another field of the data frame. The various signal polarities shown in timing diagram 605 are merely illustrative and may not all match the corresponding polarities of a data frame format identified in the non-compressed video interface specification. Such signal polarities are not limiting on certain embodiments.

Timing diagram 605 shows elements of an exchange of an illustrative 313 horizontal line Field 2 of the data frame. An offset between the timing for field 1 in timing diagram 600 and the timing for field 2 of timing diagram 605 is illustrated by respective time period numbers shown for HSYNC 620 and HSYNC 650. A highlight area of timing diagram 605 includes 17 horizontal lines of data when DE 640 is active, where the 17 horizontal lines are for the communication of sideband (SB) data. But for the modified timing represented in timing diagram 605, DE 640 might, according to the specified data frame format, remain disserted during these 17 lines.

Figure 7:
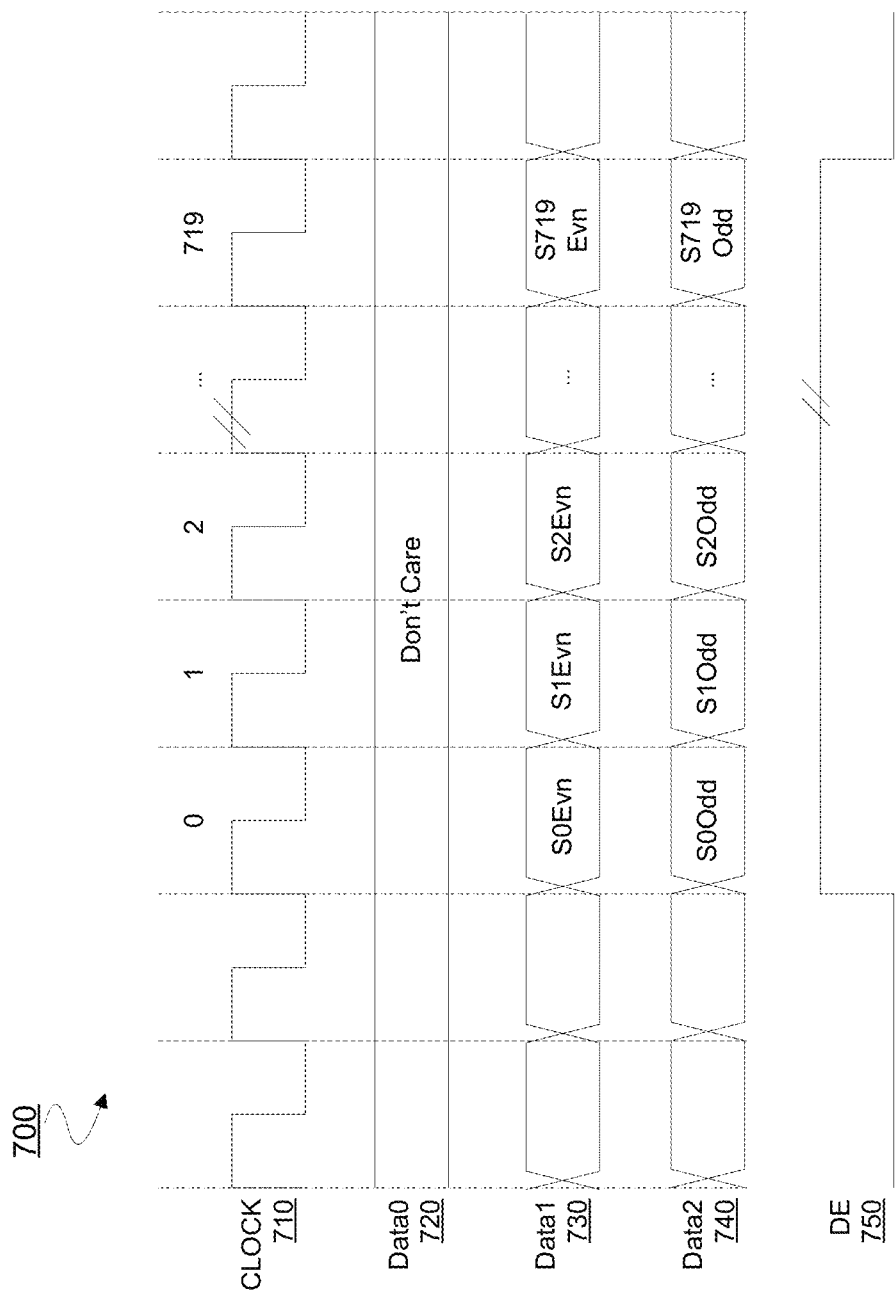
FIG. 7 is a timing diagram illustrating elements of an exchange of a data frame according to an embodiment.

FIG. 7 is a timing diagram 700 illustrating elements of an exchange of a horizontal line of an active frame according to an embodiment. Timing diagram 700 may represent features of a communication such as communication 150. The data frame represented by timing diagram 700 may include some or all of the features of data frame 502b or of data frame 504b, for example.

Timing diagram 700 shows a parallel exchange of a clock signal CLOCK 710, a plurality of data signals, represented by the illustrative Data0 720, Data1 730, Data2 740, and a data enable signal DE 750. In an embodiment, DE 750 provides functionality—e.g. corresponding to that of DE 610—for distinguishing a horizontal blanking period for a horizontal line from an active data period for that horizontal line. Accordingly, assertion of DE 750 (in this example, to a logic high state) indicates that corresponding data of Data0 720, Data1 730, Data2 740 is active data, rather than horizontal blanking data.

Some or all of CLOCK 710, Data0 720, Data1 730, and Data2 740 may be implemented as respective differential signal pairs, in an embodiment. By way of illustration and not limitation, CLOCK 710 may correspond functionally to the transition-minimized differential signaling (TMDS) clock signal pair Clock+/Clock− of a HDMI specification. Alternatively or in addition, Data0 720, Data1 730, and Data2 740 may each correspond functionally to a respective one of the TMDS signal pairs Data0+/Data0−, Data1+/Data1− and Data2+/Data2− of such a HDMI specification.

Different respective dimensions of a color space (e.g. Red/Green/Blue or YCbCr) may be allocated each to a respective one of Data0 720, Data1 730, and Data2 740, although certain embodiments are not limited in this regard. For example, video data of a data frame may be comprised of non-compressed pixel color values each for a respective one of the Red, Green and Blue dimensions of the RGB color space. In such an embodiment, Blue color values may be communicated via Data0 720, Green color values via Data1 730, and Red color values via Data2 740, for example. As shown in timing diagram 700, a horizontal line of data of the illustrated data frame includes sideband data S0, S1, S2, . . . , S719 which is communicated as active data—i.e. where DE 750 is asserted in association with communication of S0, S1, S2, . . . , S719.

In an embodiment, the data frame includes a double sampled version of sideband data S0, S1, S2, . . . , S719. For example, at time 0, Data2 740 may communicate a first sample S0Odd of sideband data value S0, and Data1 730 may communicate a second sample S0Evn of the same sideband data value S0. Similarly, at time 1, Data2 740 may communicate a first sample S0Odd of sideband data value S1, and Data1 730 may communicate a second sample S0Evn of the same sideband data value S1. Such communication of double sampled sideband data values may continue through samples S719Odd, S719Evn for sideband data value S719. In an embodiment, one of the data signals—in this example, Data0 720—is reserved from use in communicating such active sideband data.

Figure 8:
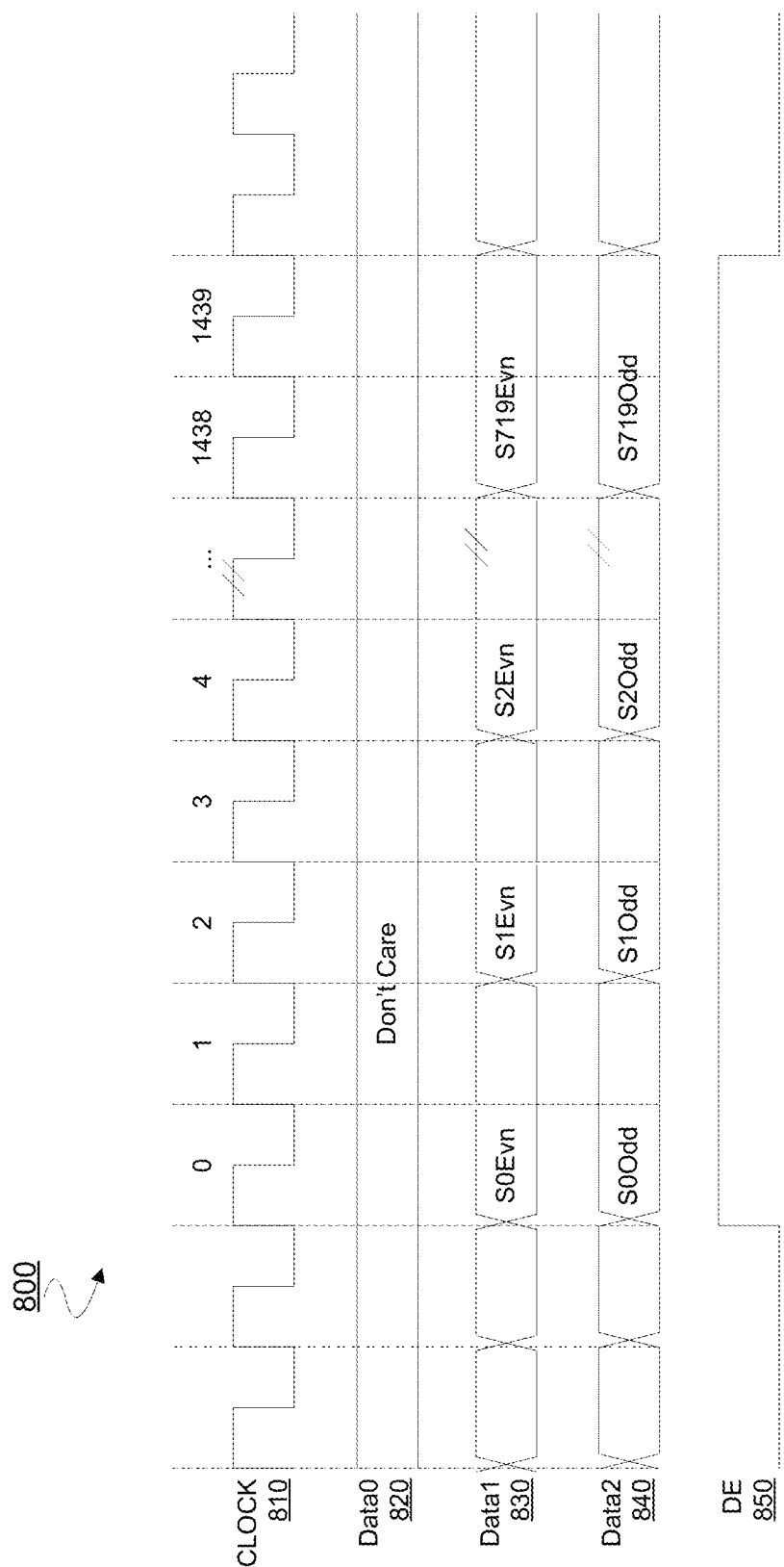
FIG. 8 is a timing diagram illustrating elements of an exchange of a data frame according to an embodiment.

FIG. 8 is a timing diagram 800 illustrating elements of an exchange of a data frame according to an embodiment. Timing diagram 800 illustrates an alternative communication of a data frame to that shown in timing diagram 700—i.e. where CLOCK 810, Data0 820, Data1 830, Data2 840, and DE 850 of timing diagram 800 correspond, respectively, to CLOCK 710, Data0 720, Data1 730, Data2 740, and DE 750. The data frame represented by timing diagram 800 is exchanged, according to an embodiment, with 2× pixel repetition, where communication of an active sideband data value spans two cycles of CLOCK 810, rather than the single cycle span shown in timing diagram 700.

Figure 9:
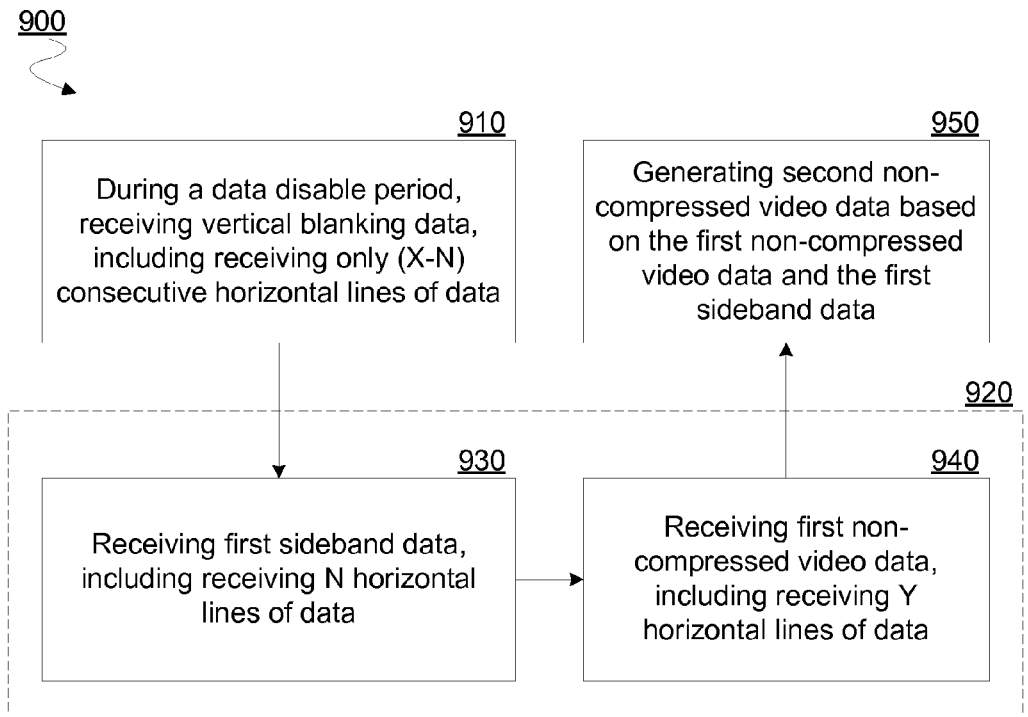
FIG. 9 is a flow diagram illustrating elements of a method for generating a data frame according to an embodiment.

FIG. 9 illustrates elements of a method 900 for processing a data frame according to an embodiment. The data frame processed according to method 900 may, for example, include some or all of the features of data frame 502b and/or of data frame 504b. In an embodiment, method 900 is performed by a device implementing functionality such as that of video sink 160.

Method 900 may include operations for receiving the data frame via a hardware interconnect compatible with physical layer requirements of a non-compressed video interface specification. In an embodiment, the non-compressed video interface specification identifies a format for a data frame. The format may comprise a total of X consecutive horizontal lines of vertical blanking data and a total of Y consecutive horizontal lines of data including video data, where X is a first integer and Y is a second integer.

In an embodiment, receiving such a data frame includes, at 910, receiving, during a data disable period, vertical blanking data, including receiving only (X−N) consecutive horizontal lines of data, where N is a third integer. The data disable period may, for example, be a period specified by a vertical data enable control signal such as VDE 516—e.g. where the data disable period is vertical blanking interval.

Method 900 may further include operations 920 during an alternate period, referred to as a data enable period, for the communication of other information in the data frame. For example, the operations 920 may include, at 930, receiving first sideband data, including receiving N horizontal lines of data. In an embodiment, some or all of the N horizontal lines variously include respective sideband data values and respective horizontal blanking data values. In an embodiment, the operations 920 further include, at 940, receiving first non-compressed video data, including receiving Y horizontal lines of data. In an embodiment, some or all of the Y horizontal lines variously include respective video data values and respective horizontal blanking data values. The Y horizontal lines received at 940 may include all active video data of the data frame.

Method 900 may further comprise, at 950, generating second non-compressed video data based on the first sideband data received at 930 and the first non-compressed video data received at 940. For example, the first non-compressed video data may include respective pixel color values for one or more pixels of the video frame. In an embodiment, generating the second non-compressed video data includes mapping or otherwise associating values of the first sideband data each with a respective pixel of the video frame. Based on such mapping, pixel color values of the first non-compressed video data which correspond to such pixels may be masked, substituted, or modified. By way of illustration and not limitation, portions of a received video frame may be altered based on—"blended" with—active sideband data of the video frame to include a visual representation of sideband data.

Figure 10:
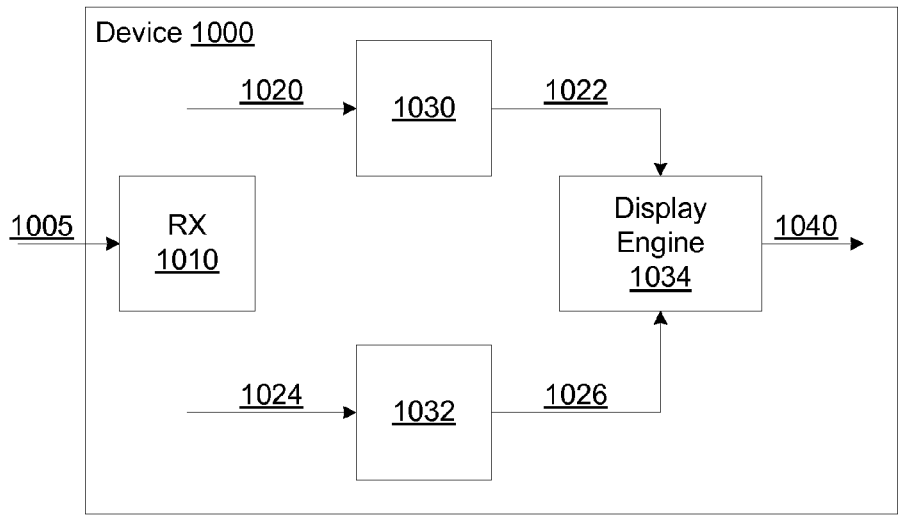
FIG. 10 is a block diagram illustrating elements of a device for processing a data frame according to an embodiment.

FIG. 10 illustrates elements of a device 1000 for processing a data frame generated according to an embodiment. Device 1000 may include some or all of the features of video sink 160. In an embodiment, processing of a data frame by device 1000 may be according to method 900.

Device 1000 may include receiver circuitry RX 1010 to receive an input 1005 which includes one or more features of communication 150. For example, input 1005 may include a data frame such as data frame 502b. The data frame may further include an active data frame comprising both video data and sideband data. RX 1010 may include logic to identify one or more portions of input 1005 as being sideband data. For example, logic of RX 1010 may be configured to identify, according to a pre-determined timing for a data frame format, that a particular N horizontal lines of an active data frame is for communicating active sideband data.

In an embodiment RX 1010 provides to process circuitry 1030 first sideband data 1020 from an active frame of the received data frame. By way of illustration and not limitation, RX 1010 may perform demultiplexing to separate sideband data for communication to process circuitry 1030. In an embodiment, RX 1010 processes double samples of sideband data values in the data frame. Alternatively, such double samples may be included in first sideband data 1020 for processing by process circuitry 1030.

RX 1010 may further provide first frame data 1024 to process circuitry 1032 of device 1000, where first frame data 1024 includes frame data other than—e.g. in addition to—active sideband data. For example, first frame data 1024 may include some or all of video data, control data and packetized data. Where first frame data 1024 includes such sideband data, process circuitry 1032 may mask out such data to accommodate later data frame processing by device 1000.

In an embodiment, process circuitry 1030 performs one or more operations to generate pixel data 1022 based on first sideband data 1020. By way of illustration and not limitation, process circuitry 1030 may perform operations for variously converting sideband data values into information for use in replacing, masking or otherwise modifying pixel color values of the data frame. Such information may include alternate pixel colors, for example, or data for determining such alternate pixel colors. In an embodiment, process circuitry 1032 performs one or more operations to provide video data 1026 based on video data of first frame data 1024. By way of illustration and not limitation, process circuitry 1032 may perform operations to variously isolate, synchronize, order, condition or otherwise prepare video data for a HD display.

Video data 1026 and pixel data 1022 may be provided to display engine 1030 of device 1000—e.g. where display engine 1034 is to generate an output 1040 to provide to HD video display hardware (not shown). In an embodiment, display engine 1034 performs one or more multiplexing operations to variously interleave portions of pixel data 1022 with portions of video data 1026. Alternatively, display engine 1034 may perform operations to calculate pixel color values based on values of pixel data 1022 and pixel color values of video data 1026.

FIGS. 11A-11D illustrate elements of various packets to facilitate communication and/or processing of a data frame according to various embodiments. InfoFrames, such as those illustrated by FIG. 11A-11C, are a generally used type of control packet in the communication of digital video streams—e.g. according to HDMI and/or MHL requirements. By communicating InfoFrames from a source device to a sink device, a source device may send information describing functionality and/or other characteristics of an AV stream. A Vendor Specific Data Block (VSDB), such as illustrated by FIG. 11D, is generally used by a sink device to communicate with a source device to indicate vendor specific functionality and/or characteristics which a sink device may support. With such InfoFrame and VSDB information, the sink and source devices may agree upon one or more parameters according to which AV data is to be included, timed, arranged etc. in a data stream.

Conventionally, there are two main categories of InfoFrames related to video data communications—an Auxiliary Video Information (AVI) InfoFrame type for communicating information generic to various types of devices and a Vendor Specific InfoFrame (VSIF) type for communicating information specific to devices of a particular vendor (e.g. manufacturer). Such InfoFrame conventions may be adapted, according to various embodiments, to facilitate the communication of sideband data as active data of a video frame. Based on these two types of InfoFrames, a sink device may identify video timing by a source device to differentiate active sideband data and active video data from one another.

In an embodiment, an AVI InfoFrame exchanged between sink and source devices includes Video Identification Code (VIC) values which are each are set to zero (0), indicating that no information regarding a video coding type is included in the AVI InfoFrame, and that such video coding information is instead to be determined with reference to a VSIF. FIG. 11A illustrates elements of a packet header 1100a for a VSIF which provides such video coding information. In this example, packet header 1100a is compatible with an HDMI format for a VSIF packet header.

FIG. 11B illustrates elements of a format 1100b for contents of a VSIF packet which is encapsulated by packet header 1100a. Format 1100b is the general packet content structure of one type of VSIF—e.g. for InfoFrames specific to Silicon Image. Format 1100b includes bytes PB1 to PB3 to store a 3-byte, vendor-specific Organizationally Unique Identifier (OUI) code assigned by IEEE (e.g. 0x00D0BD for Silicon Image). When VSIF_Type=1 (PB4) and with valid bytes indicated by SCM_Length (PB5), a payload of the VSIF may be used to carry a Sideband Channel Message (SCM). The payload of a VSIF may carry one or multiple SCM sub-packets—e.g. up to 7 sub-packets (SCM_ID1, ..., SCM_ID7), in the example of format 1100b. FIG. 11B includes a legend for format 1100b which shows an example, according to one embodiment, of how SCM identification values SCM IDx may be used to specify respective SCM types.

FIG. 11C illustrates elements of a vendor specific InfoFrame packet 1100c, based on format 1100b, which is to facilitate communication of sideband data in an active frame according to an embodiment. VSIF packet 1100c may be sent with a corresponding AVI InfoFrame which, for example, has VICs all set to zero (0). VSIF packet 1100c may include a SCM identifier field SCM_ID which, when set to one (0x01), specifies that sideband data, in addition to any video data, is included in the data frame as active data (e.g. outside of a vertical blanking period of the data frame). In the example of FIG. 11C, VSIF packet 1100c includes Video Format Identification Code fields VIC0, ..., VIC6 which, in an embodiment, communicate video format information as specified by CEA 861-D. VSIF packet 1100c may further include—e.g. in byte PB9—a "Last Line Number with Active VBI" field which is used to identify the number of the last horizontal line of a data frame, after a Vsync pulse, which includes active sideband data (also referred to herein as Active VBI data).

FIG. 11D illustrates elements of another vendor specific data block (VSDB) 1100d to further facilitate communication of sideband data in an active frame according to an embodiment. VSDB 1100d may be transmitted by a video sink device to communicate Extended Display Identification Data (EDID) to a corresponding video source device. EDID such as VSDB 1100d may be used to indicate to a source device display capabilities of the sink device. Upon request, EDID information may be provided to the source device—e.g. in a VSDB from the sink device—for the source device to determine whether and/or how information may be sent across a link. For example, VSDB 1100d may communicate that a sink device includes functionality for processing sideband data provided in an active data portion of a data frame. In the illustrative example, of FIG. 11D, VSDB 1100d is compatible with a HDMI format for vendor specific data blocks with the same OUI code.

For example, similar to a VSIF (which is transmitted from a source device to a sink device) VSDB 1100*d* may include an OUI field to differentiate a particular vendor. Alternatively or in addition, a length field of VSDB 1100*d* may indicate a total length of the data block. In an embodiment, VSDB 1100*d* may include respective fields to indicate whether the sink device supports, for example, Raw VBI functionality and/or the like. By way of illustration and not limitation, a Supports RawVBI bit may be set if the sink device supports 2× oversampled VBI raw data in the active frame of a data frame. In an embodiment, VSDB 1100*d* further includes a "First Line Number with Active VBI" byte to identify the number of the first horizontal line of a data frame, after a Vsync pulse, which includes active sideband data.

Techniques and architectures for providing audio/video communication are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A device comprising:
first circuitry to receive first sideband data of a first data frame and first video data of the first data frame, including the first circuitry to receive the first sideband data during a first vertical blanking period;
second circuitry to generate a second data frame based on the received first data frame; and
third circuitry to transmit the second data frame via a hardware interconnect compatible with physical layer requirements of an interface specification, wherein the interface specification includes a data frame format comprising a total of X consecutive horizontal lines of vertical blanking data and a total of Y consecutive horizontal lines of data including video data, the third circuitry to transmit the second data frame including:
during a data disable period, the third circuitry to transmit vertical blanking data, including the third circuitry to transmit only (X−N) consecutive horizontal lines of data; and
during a data enable period:
the third circuitry to transmit second sideband data based on the first sideband data, including the third circuitry to transmit N horizontal lines of data; and
the third circuitry to transmit non-compressed video data, including the third circuitry to transmit Y horizontal lines of data, wherein X is a first integer, Y is a second integer, and N is a third integer.

2. The device of claim 1, wherein the third circuitry to transmit the second sideband data includes the third circuitry to transmit double samples of a sideband data value.

3. The device of claim 2, wherein the hardware interconnect includes three data signal lines, and wherein, of the three data signal lines, the third circuitry is to transmit the second sideband data with only two data signal lines.

4. The device of claim 1, wherein the interface specification is a High-Definition Multimedia Interface specification or a Mobile High-definition Link specification.

5. The device of claim 1, wherein the second sideband data includes closed caption data or teletext data.

6. A device comprising:
first circuitry to receive a first data frame via a hardware interconnect compatible with physical layer requirements of an interface specification, wherein the interface specification includes a data frame format comprising a total of X consecutive horizontal lines of vertical blanking data and a total of Y consecutive horizontal lines of data including video data, the first circuitry to receive the first data frame including:
during a data disable period, the first circuitry to receive vertical blanking data, including the first circuitry to receive only (X−N) consecutive horizontal lines of data; and
during a data enable period:
the first circuitry to receive first sideband data, including the first circuitry to receive N horizontal lines of data; and
the first circuitry to receive first non-compressed video data, including the first circuitry to receive Y horizontal lines of data, wherein X is a first integer, Y is a second integer, and N is a third integer; and
second circuitry to generate second non-compressed video data based on the first non-compressed video data and the first sideband data.

7. The device of claim 6, wherein the first circuitry to receive the first sideband data includes the first circuitry to receive double samples of a sideband data value.

8. The device of claim 7, wherein the hardware interconnect includes three data signal lines, and wherein, of the three data signal lines, the first circuitry is to receive the first sideband data with only two data signal lines.

9. The device of claim 6, wherein the interface specification is a High-Definition Multimedia Interface specification or a Mobile High-definition Link specification.

10. The device of claim 6, wherein the first sideband data includes closed caption data or teletext data.

11. A method comprising:
receiving first sideband data of a first data frame and first video data of the first data frame, including receiving the first sideband data during a first vertical blanking period;
generating a second data frame based on the received first data frame; and
transmitting the second data frame via a hardware interconnect compatible with physical layer requirements of an interface specification, wherein the interface specification includes a data frame format comprising a total of X consecutive horizontal lines of vertical blanking data and a total of Y consecutive horizontal lines of data including video data, the transmitting the second data frame including:
during a data disable period, transmitting vertical blanking data, including transmitting only (X−N) consecutive horizontal lines of data; and
during a data enable period:
transmitting second sideband data based on the first sideband data, including transmitting N horizontal lines of data; and
transmitting non-compressed video data, including transmitting Y horizontal lines of data, wherein X is a first integer, Y is a second integer, and N is a third integer.

12. The method of claim 11, wherein transmitting the second sideband data includes transmitting double samples of a sideband data value.

13. The method of claim 12, wherein the hardware interconnect includes three data signal lines, and wherein, of the three data signal lines, transmitting the second sideband data includes transmitting with only two data signal lines.

14. The method of claim 11, wherein the interface specification is a High-Definition Multimedia Interface specification or a Mobile High-definition Link specification.

15. The method of claim 11, wherein the second sideband data includes closed caption data or teletext data.

16. A method comprising:
receiving a first data frame via a hardware interconnect compatible with physical layer requirements of an interface specification, wherein the interface specification includes a data frame format comprising a total of X consecutive horizontal lines of vertical blanking data and a total of Y consecutive horizontal lines of data including video data, the receiving the first data frame including:
during a data disable period, receiving vertical blanking data, including receiving only (X−N) consecutive horizontal lines of data; and
during a data enable period:
receiving first sideband data, including receiving N horizontal lines of data; and
receiving first non-compressed video data, including receiving Y horizontal lines of data, wherein X is a first integer, Y is a second integer, and N is a third integer; and
generating second non-compressed video data based on the first non-compressed video data and the first sideband data.

17. The method of claim 16, wherein receiving the first sideband data includes receiving double samples of a sideband data value.

18. The method of claim 17, wherein the hardware interconnect includes three data signal lines, and wherein, of the three data signal lines, receiving the first sideband data includes receiving with only two data signal lines.

19. The method of claim 16, wherein the interface specification is a High-Definition Multimedia Interface specification or a Mobile High-definition Link specification.

20. The method of claim 16, wherein the first sideband data includes closed caption data or teletext data.

* * * * *